United States Patent [19]
Whitehouse et al.

[11] 3,911,257
[45] Oct. 7, 1975

[54] INSTRUMENT FOR MEASURING CURVED SURFACE VARIATIONS

[75] Inventors: David John Whitehouse, Melton Mowbra; Philip Ross Bellwood, Arthingworth; Derek Gordon Chetwynd, Wigston, all of England

[73] Assignee: The Rank Organisation Limited, London, England

[22] Filed: May 23, 1974

[21] Appl. No.: 472,724

[30] Foreign Application Priority Data
May 23, 1973 United Kingdom............... 24748/73

[52] U.S. Cl............................. 235/151.3; 33/174 Q
[51] Int. Cl.²..................... G01B 5/28; G01B 5/00
[58] Field of Search................. 33/174 Q; 235/151.3

[56] References Cited
FOREIGN PATENTS OR APPLICATIONS
929,943   6/1963   United Kingdom................... 33/174

*Primary Examiner*—Eugene G. Botz
*Attorney, Agent, or Firm*—Brisebois & Kruger

[57] ABSTRACT

A method of testing a curved surface of a body, which can be used on bodies having only partial arcs available for testing and apparatus for performing the method comprising drawing a sensor over the surface of the body between two end points at which the relative angular orientation of the sensor and the body are known, and calculating from the information signals from the sensor, and from signals representing the relative angular orientation of the body and the sensor during the traverse, the parameters of a best fit limacon from which data indicating the eccentricity between the centre of the partial arc on the body with respect to the centre of relative rotation can be obtained and also a signal can be generated representing a reference figure against which surface variations of the body over the partial arc can be compared.

26 Claims, 6 Drawing Figures

CHART WIDTH

INSTRUMENT FOR MEASURING CURVED SURFACE VARIATIONS

The present invention relates to surface measurement, and particularly to a method and apparatus for deriving useful parameters from only a part of a workpiece surface.

In the art of surface measurement it is known to utilise machines having a stylus which is tranversed over the surface to provide a signal representing the particular form of the surface. In the case of nominally circular workpieces the stylus and workpiece are mounted for relative rotation and the stylus provides a signal representing the out-of-roundness variations of the workpiece and the roughness of the surface. One of the difficulties encountered in known such apparatus is that of accurately aligning the centre of relative rotation between the workpiece and the stylus with the centre of the workpiece itself. In order to determine the eccentricity of mounting it has hithertofore been necessary to relatively rotate the sensor stylus and the workpiece through a number of rotations, although recent advances have permitted the eccentricity term to be computed from the signal from the sensor after only one complete revolution.

There are certain workpiece forms, however, which have presented additional difficulties due to the fact that they do not have a completely circular part of the surface. It has not hithertofore been possible to use this form of sensing apparatus on nominally circular components having a discontinuity in the surface, such as a keyway, or being made up of partial arcs such as are found in the races of ball bearings. The present invention seeks to provide a method and apparatus for sensing such workpieces, and for determining the eccentricity between the centre of the workpiece and the centre of relative rotation between the workpiece and the sensor after relative rotation through only an arc.

It will be appreciated that as used in this Specification the term "centre of the workpiece" will relate to the nominal centre of a circularly curved part of a workpiece, and thus will relate to workpieces which are not in themselves circular but which have parts of their surface which have a nominally circular arcuate form.

Because the out-of-roundness variations and the roughness variations of a circular part of a component are usually very much smaller in magnitude than the nominal radius of the part the signal from the stylus can only provide a measure of the relatively smaller out-of-roundness and roughness variations if the radius term is suppressed. This is necessary also because of the otherwise impossibly high dynamic range-to-resolution ratio which would be imposed on the transducer and because of problems of display which would otherwise arise. When displaying the out-of-roundness and roughness variations of a component only the signal variations from the stylus are magnified so that, effectively, only the outermost "geometric skin" of the component is displayed or used. This involves, in effect two operations, radius suppression and magnification of the remainder. These two operations have the effect of modifying the geometric character of the signal which emerges from the transducer from that of a nominally circular component to a different form.

According to the present invention there is provided a method of testing a nominally circular or part circular surface of a body by traversing a sensor over the surface to provide signals representative of the profile thereof, in which the traverse is effected by relative rotation between the body and the sensor over a limited arc, less than a full circle, the sensor signals are amplified, and there are provided signals representative of the relative angular orientation of the body and the sensor with respect to a reference orientation, the angular orientation signals being combined with the amplified sensor signals to provide an output signal representative of a reference line centred at the centre of the circular or part circular surface of the body traversed by the sensor to which deviations of the surface over the arc sensed may be referred, and/or to provide signals representative of the eccentricity of the centre of the circular or part circular surface of the body over the arc sensed with respect to the centre of relative rotation between the body and the sensor.

It can be shown that for a truly circular component which is located slightly eccentricically in relation to the centre of relative rotation of the workpiece and the stylus, after the two operations of radius suppression and magnification of the variations in the signal, the signal which is actually displayed on a chart or otherwise utilised by the instrument no longer represents the shape of a displaced circle beacause the relative sizes of the individual terms has been changed.

Thus, whereas the equation of the truly circular component whose centre O' is positioned eccentrically by e ($\phi$) from the centre of relative rotation O of the instrument is given by:

$$k(\theta) = e \cos(\theta - \phi) + \sqrt{R^2 - e^2 \sin^2(\theta - \phi)}$$

where $R$ is the nominal radius of the workpiece from the centre thereof, the line derived from this after magnification and radius suppression, where $t$ is the radius of the workpiece as seen on the chart, is given by $$k(\theta) = T + e \cos(\theta - \phi)$$

Thus, whereas the original signal represents the equation of a true circle displaced about a centre, the processed signal which is displayed or used by a roundness measuring instrument does not represent the equation of a circle but that of a limacon, the general polar equation for which is:

$$Z = a \cos\theta + b.$$

The inventors of the present invention have found that a signal in the form:

$$\rho(\theta) = \bar{R} + \bar{x}\cos\theta + \bar{y}\sin\theta$$

provides a satisfactory reference line, when plotted, against which variations in the surface profile signal can be compared. This line can be generated from information derived from a sensor traverse over less than a full circle providing the parameters $\bar{x}$, $\bar{y}$ and $\bar{R}$, which are defined below, are formed as solutions to the equation:

$$I = \int_{\Theta_1}^{\Theta_2} [r(\Theta) - (\bar{R} + \bar{x}\cos\Theta + \bar{y}\sin\Theta)]^2 d\Theta$$

where $r$, $\bar{R}$, $\bar{x}$, $\bar{y}$ and $\theta$ represent the parameters defined as follows:

$r(\theta)$ is the value of the radial deviation of the surface of the workpiece from the centre of relative rotation at an angle $\theta$ from a reference angle after then suppressed radius (S) has been taken from it.

$\bar{R}$ is the nominal radius of the reference line $\bar{x}$ is the $x$ coordinate of the centre of the workpiece with respect to the centre of the relative rotation of the workpiece and sensor.

$\bar{y}$ represents the $y$ coordinate of the centre of the workpiece with respect to the centre of relative rotation of the workpiece and sensor $\theta_1$ and $\theta_2$ respectively represent the angular orientation between the body and the sensor at the beginning and end points of the traverse of the sensor over the body. Thus the present invention also comprehends a method of testing a nominally circular or part circular surface of a body in which a sensor is traversed over the surface by effecting relative rotation between the body and the sensor over a limited arc less than a full circle and combining the output signal from the sensor with signals representative of the relative angular orientation of the body and the sensor to provide an output signal of the form:

$$\rho(\theta) = \bar{R} + \bar{x} \cos \theta + \bar{y} \sin \theta$$

If the parameters $\bar{x}$ and $\bar{y}$ of the expression are separately derived they will represent the $x$ and $y$ coordinate of the centre of the workpiece with respect to the reference centre, and these can be modified to be equal to the said eccentricity components by demagnifying them by an appropriate amount.

According to another aspect of the present invention there is provided apparatus for testing a nominally circular or part circular surface of a body comprising a sensor, means for mounting the body for relative rotation with respect to the sensor whereby to provide sensor signals when the sensor is traversed over the surface upon relative rotation between the body and the sensor, means for providing signals representing the relative angular orientation of the sensor and the body, and a computing circuit for combining the sensor output signals with the angular orientation signals produced from a traverse over an arc of the surface less than a full circle to provide signals representing the parameters $\bar{x}$ and $\bar{y}$ as hereinbefore defined.

Preferably there are further provided means for demagnifying the signals representing the parameters $x$ and $y$ to provide a representation of the $\bar{x}$ and $\bar{y}$ coordinates of the centre of the part of the surface of the body under test with respect to the centre of relative rotation between the body and the sensor.

In a preferred embodiment of the invention there are further provided means for deriving, from the sensor signals and the angular orientation signals, a signal representing the parameter $\bar{R}$ as herein defined, and means for combining the signals representing the parameter $\bar{R}$, $\bar{x}$ and $\bar{y}$ into an output signal of a form represented by the expression:

$$\rho(\theta) = \bar{R} + \bar{x} \cos \theta + \bar{y} \sin \theta$$

to represent a reference signal against the variations in the sensor signal can be referred.

The invention will now be more particularly described, by way of example, with reference to the accompanying schematic drawings, in which.

Figure 1:
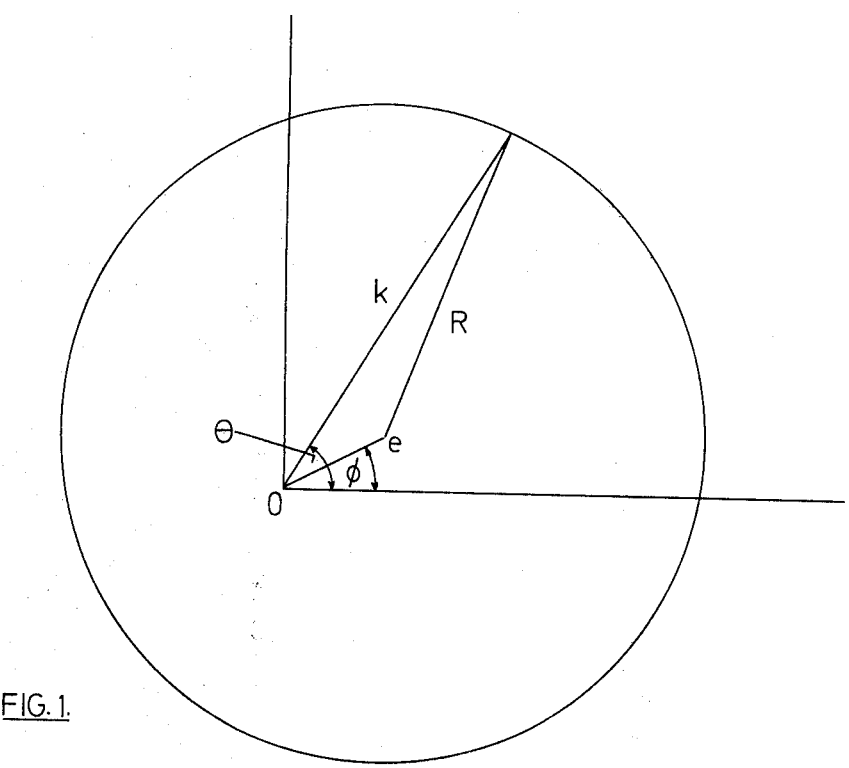
FIG. 1 is a diagram representing a circular component, which is eccentrically mounted with respect to the reference centre O.
Figure 2:
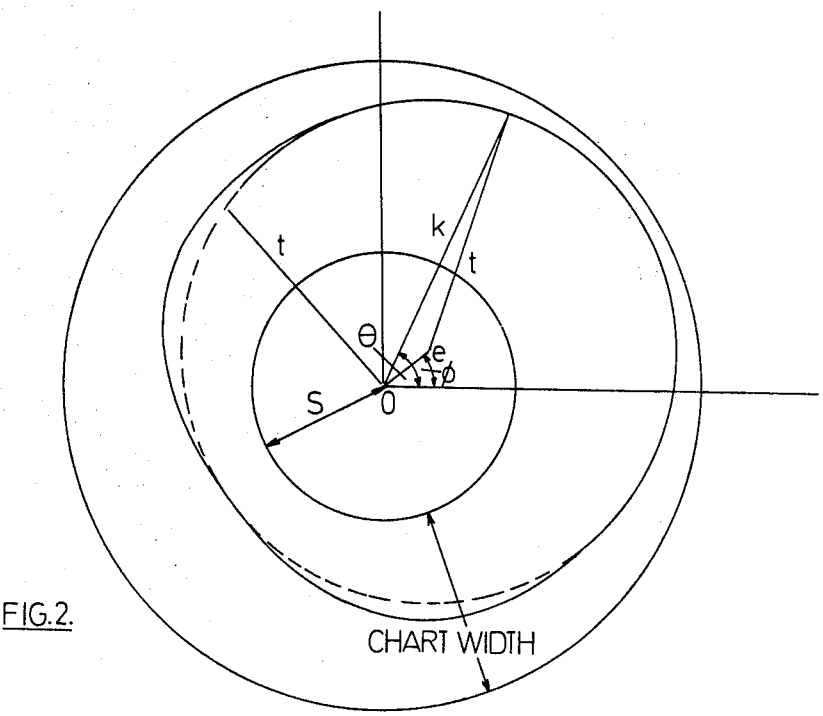
FIG. 2 is a schematic diagram illustrating the form of the signal after modification to make it suitable for graphical display.
Figure 3:
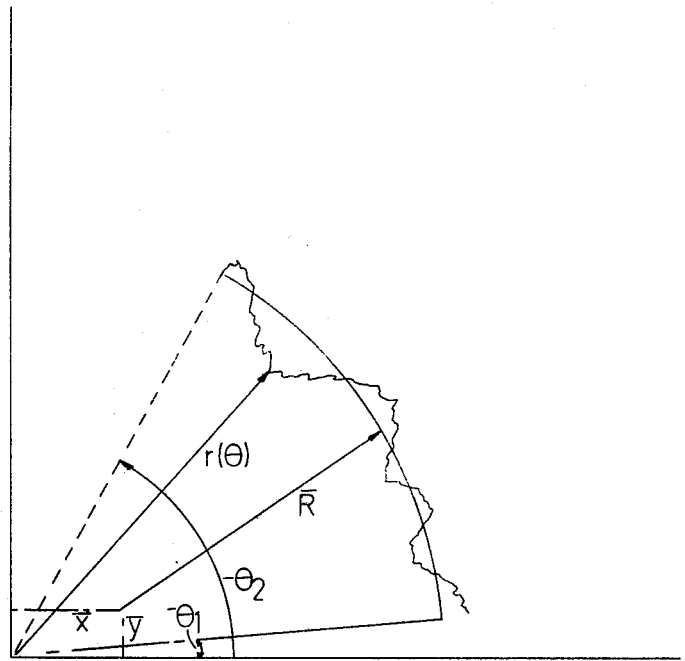
FIG. 3 is a diagram illustrating the particular form of an arcuate surface, and a best fit reference line provided by the method of the invention.

Referring now to the drawings it will be appreciated that if, as shown in FIG. 3, $r(\theta)$ is the instantaneous value of the surface signal, having different values as $\theta$ changes, the reference line to the data signal from the transducer before display on the chart has the following equation where M = magnification and S = suppressed radius.

$$M(R-S) + M e \cos(\theta - \phi)$$

and letting $M(r-L) = \bar{R}$, Me = E and $M e \cos(\theta - \phi) = \bar{x}$ $M e \sin(\theta - \phi) = \bar{y}$ for simplicity then the limacon form for the reference line between $\theta_1$ and $\theta_2$ is $\rho(\theta) - f = \bar{R} + \bar{x} \cos\theta + \bar{y} \sin\theta$ and in order to get the best-fit limacon haiving parameters $\bar{R}, \bar{x}, \bar{y}$ to the raw data $r(\theta)$ the following equation has to be minimised. Here for simplicity the argument $\theta$ to the $r$ values will be omitted. The criterion for best fit will be least squares. Thus the integral $$I = \int_{\theta_1}^{\theta_2} [r - (\bar{R} + \bar{x} \cos\theta + \bar{y} \sin\theta)]^2 d\theta$$

has to be minimised with respect to $\bar{R}, \bar{x}$, and $\bar{y}$ respectively. This implies that $$\frac{dI}{d\bar{R}} = 0 \; ; \; \frac{dI}{d\bar{x}} = 0 \; ; \; \frac{dI}{d\bar{y}} = 0.$$

The solutions to the differential equations thus formed, over a limited arc from $\theta_1$ to $\theta_2$, can be shown to be as follows:

$$\bar{x} = \frac{1}{E} \left\{ A \left( \int_{\theta_1}^{\theta_2} r\cos\theta d\theta - B \int_{\theta_1}^{\theta_2} r d\theta \right) + C \left( \int_{\theta_1}^{\theta_2} r\sin\theta d\theta - D \int_{\theta_1}^{\theta_2} r d\theta \right) \right\}$$

$$\bar{y} = \frac{1}{E} \left\{ F \left( \int_{\theta_1}^{\theta_2} r\sin\theta d\theta - D \int_{\theta_1}^{\theta_2} r d\theta \right) + C \left( \int_{\theta_1}^{\theta_2} r\cos\theta d\theta - B \int_{\theta_1}^{\theta_2} r d\theta \right) \right\}$$

$$\bar{R} = \frac{1}{\theta_2 - \theta_1} \int_{\theta_1}^{\theta_2} r d\theta - \frac{\bar{x}}{\theta_2 - \theta_1} \int_{\theta_1}^{\theta_2} \cos\theta d\theta - \frac{\bar{y}}{\theta_2 - \theta_1} \int_{\theta_1}^{\theta_2} \sin\theta d\theta$$

The constants A, B, C, D, E and F in the above general solutions can be shown to be as follows:

$$A = \int_{\Theta_1}^{\Theta_2} \sin^2\Theta\, d\Theta - \frac{1}{\Theta_2 - \Theta_1}\left[\int_{\Theta_1}^{\Theta_2} \sin\Theta\, d\Theta\right]^2$$

$$B = \frac{1}{\Theta_2 - \Theta_1}(\sin\Theta_1 - \sin\Theta_2)$$

$$C = \frac{1}{\Theta_2 - \Theta_1}\int_{\Theta_1}^{\Theta_2} \cos\Theta\, d\Theta \int_{\Theta_1}^{\Theta_2} \sin\Theta\, d\Theta - \int_{\Theta_1}^{\Theta_2} \sin\Theta\cos\Theta\, d\Theta$$

$$D = \frac{1}{\Theta_2 - \Theta_1}(\cos\Theta_1 - \cos\Theta_2)$$

$E = AF - C^2$ where $A$ $F$ and $C$ are as here defined $$F = \int_{\Theta_1}^{\Theta_2} \cos^2\Theta\, d\Theta - \frac{1}{\Theta_2 - \Theta_1}\left[\int_{\Theta_1}^{\Theta_2} \cos\Theta\, d\Theta\right]^2$$

Apparatus constructed to perform the method of the invention thus requires to incorporate, in addition to the sensor stylus, means sensitive to the angular displacement between the workpiece and the stylus from a reference orientation. This may be also arranged to provide the sine and cosine values of the angles, or these may be subsequently derived in a computer.

The fitting of a best fit limacon to a signal representing a limited arc of roundness data is entirely consistent with the establishment of a best fit circle at present set out in the National Standard. This can be seen by considering the expression for the parameters $\bar{x}$, $\bar{y}$, and $\bar{R}$ in the special case when $\theta_2 - \theta_1 = 2\pi$. The expressions then reduce to:

$$\bar{x} = \frac{1}{\pi}\int_0^{2\pi} r\cos\Theta\, d\Theta$$

$$\bar{y} = \frac{1}{\pi}\int_0^{2\pi} r\sin\Theta\, d\Theta$$

$$\bar{R} = \frac{1}{2\pi}\int_0^{2\pi} r\, d\Theta$$

which are the first three Fourier Coefficients of the information signals. Moreover, it will be appreciated that the general expressions for $\bar{x}$, $\bar{y}$ and $\bar{R}$ involve only the integrals $\int r\cos\theta d\theta$, $\int r\sin\theta d\theta$ and $\int r d\theta$, together with the constants A,B,C,D,E and F, which in practice can be utilised as ratios rather than as absolute quantities.

Figure 4:
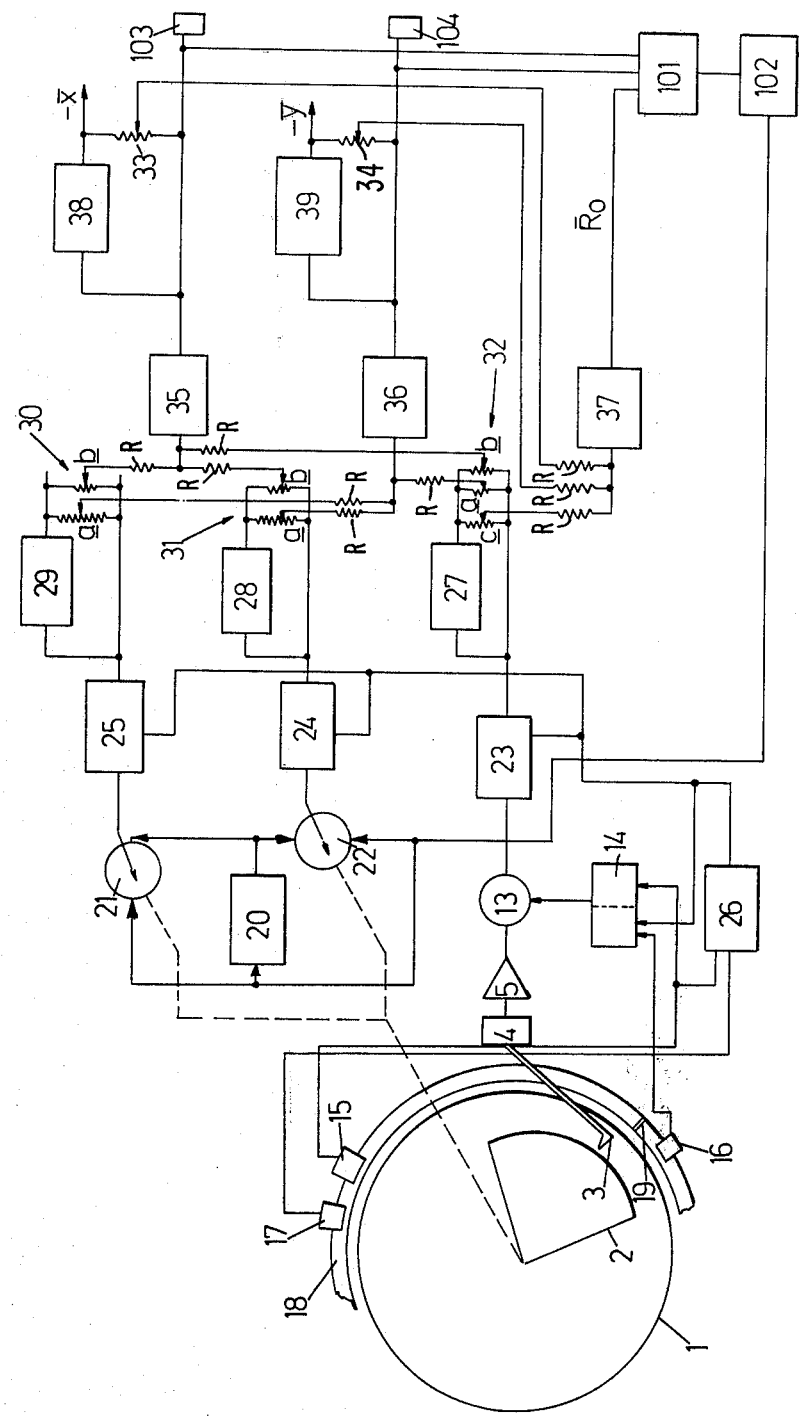
FIG. 4 is a schematic diagram of a first embodiment of the invention.

Referring now to FIG. 4 the embodiment shown comprises a turntable 1 on which is mounted a workpiece 2 having a surface providing only a partial arc of a surface over which a stylus 3 of a sensor 4 is traversed to provide an electrical signal fed to an amplifier 5 the output from which represents the instantaneous value of the radius $r(e)$ of the arcuate surface of the workpiece 2. The output from the amplifier 5 is fed to a switch 13 controlled by a bistable circuit 14 the inputs to which are fed from microswitches 15, 16 and 17 which are supported on an annular support structure (not shown in FIG. 4). The operating plungers of the microswitches 15, 16 and 17 are all arranged in the same direction for operation by an upstanding ridge 19 on a ring 18 which is mounted for rotation with the workpiece table 1 with respect to the mounting assembly (not shown) on which the microswitches 15, 16 and 17 are carried.

In operation, the workpiece table 1 rotates clockwise as viewed in FIG. 4 so that effectively the stylus 3 is traversed over the arcuate surface of the workpiece 2 in a counter clockwise direction. The output from the microswitch 15 is connected to the set input of the bistable circuit 14 so that when the ridge 19 on the ring 18 operates the microswitch 15 the bistable circuit 14 is switched to its set state and controls the switch 13 to allow passage of signals from the amplifier 5 to the remainder of the circuit, which will be described in greater detail below. The output from the microswitch 16 is coupled to the reset input of the bistable circuit 14 so that when the ridge 19 of the ring 18 switches the microswitch 16 the bistable circuit 14 is commuted to its reset state to close the switch 13 and prevent further signals from the amplifier 5 from being passed to the remainder of the circuit. The microswitch 17 has an output connected to a reset pulse generator which also receives an input from the start microswitch 15. The reset pulse generator is started by a signal from the microswitch 17 and stopped by a signal from the microswitch 15. When in operation the reset pulse generator 26 provides an output signal which is fed to the reset input of the bistable circuit 14. The position of the microswitch 17 is slightly in advance, with respect to the direction of rotation of the work table 1, of the microswitch 15 so that the bistable circuit 14 receives a reset signal shortly before the set signal from the start microswitch 15 to ensure that it is in the reset state before the commencement of an operating traverse of the stylus 3. The output from the reset pulse generator 26 is also fed to the reset inputs of three integrators 23, 24 and 25 to clear the capacitors of these and ensure that immediately before the commencement of an operating traverse these three integrators are reset to zero.

The position of the microswitches 15, 16 and 17 on their supporting assembly can be adjusted to any position around the workpiece table to adjust for any size of partial arc available from the workpiece.

As mentioned above, the output signal from the amplifier 5 represents the data signal $r$, and it is necessary to compute the integrals, $\int rd\theta$, $\int r\sin\theta d\theta$ and $\int r\cos\theta d\theta$. These are formed by means of a sine potentiometer 22 and a cosine potentiometer 21 which are mechanically connected to rotate with the workpiece table 1 by means not shown so as to be sensitive to the angular displacement of the workpiece; the potentiometers 21 and 22 are electrically connected as shown in FIG. 4 to receive signals from the amplifier 5 via the switch 13. An inverter 20 is connected in parallel with the two potentiometers 21 and 22 so that the polarity of the signals from the two potentiometers can be adjusted for different quadrants should the arcuate surface of the workpiece 2 extend over a range greater than 90°. The switch 13 is connected to an integrator 23, the output of the sine potentiometer 22 is connected to the integrator 24 and the output of the cosine potentiometer is connected to the integrator 25 so that the outputs from the three integrators respectively represent $\int rd\theta$, $\int r\sin\theta d\theta$ and $\int r\cos\theta d\theta$.

The output from each integrator is fed to potentiometers 30, 31 and 32 having windings $a$ and $b$, and in the case of the potentiometer 32 a third winding $c$. The other ends of the windings of the potentiometers 30, 31 and 32 are connected to the output of respective inverting circuits 29, 28 and 27 the inputs from which are also fed with the signals from the output of the integrators 25, 24 and 23 respectively. The windings $b$ of the potentiometers 30, 31 and 32 are all connected to the input of a summing circuit 35 via respective resistors and the windings $a$ of the potentiometers 30, 31 and 32 are all connected to the input of a summing circuit 36 via respective resistor R The winding $c$ of potentiometers 32 is connected via a resistor R to the input of a summing circuit 37 which is also fed with signals from potentiometers 33 and 34 connected across the outputs of summing circuits 35 and 36 and respective inverting circuits 38 and 39.

The seven potentiometer windings 30a, 30b, 31a, 31b, 32a, 32b and 32c are adjusted when the instrument is being set up to provide ratios representing the ratios of the constants A, B, C, D, E and F which have the values shown above, and a final constant G having the value $(\theta_2 - \theta_1)^{-1}$.

The proportioning factors of the potentiometers are shown in the following table:

| | |
|---|---|
| 30a | $\dfrac{C}{E}$ |
| 30b | $\dfrac{A}{E}$ |
| 31a | $\dfrac{F}{E}$ |
| 31b | $\dfrac{C}{E}$ |
| 32a | $\dfrac{-DF-BC}{E}$ |
| 32b | $\dfrac{-AB-CD}{E}$ |
| 32c | G |
| 33 | B |
| 34 | D |

The ratios set up by the potentiometers 30, 31, 32, 33 and 34 provide the appropriate factors for feeding the signals to the summing circuits 35, 36 and 37. The inverters 27, 28, 29, 38 and 39 enable each factor to be converted into a ratio of the appropriate sign.

The circuit described above operates as follows. The angles $\theta_1$ and $\theta_2$ are determined by the positions of the microswitches 15 and 16, and these are positioned with respect to the arcuate surface of the workpiece 2 to provide the desired angular range over which the stylus 3 provides signals to the circuit. The table 1 is then set in rotation and upon actuation of the microswitch 17 by the ridge 19 on the ring 18 the bistable circuit 14 and the capacitors of the integrators 23, 24 and 25 are cleared as mentioned above. The time interval during which the reset pulse from the generator 26 is present, that is while the table is rotating through an angle between the positions of contact of the ridge 19 with the plunger of the microswitch 17 and the plunger of the microswitch 15 enables the motor driving the turntable spindle to achieve uniform speed if this has been started only shortly before contact with the microswitch 17, and also enables the transducer to settle down from any discontinuity on the surface of the workpiece 2 with which it was in contact immediately before engaging the arcuate surface which is to be sensed.

When the positions of the microswitches 15 and 16 are determined the values of the angles $\theta_2$ and $\theta_1$ will be known and the values of the constant A to G can be calculated with reference to suitable tables since these are all determined exclusively by the value of the two angles $\theta_1$ and $\theta_2$. The values of the potentiometers 30, 31, 32, 33 snd 34 are then adjusted in accordance with the ratios shown in the table above to provide the necessary proportioning factors for the signals passing therethrough.

Thus, when the microswitch is operated to commence operation of the circuit and the switch 13 opens to allow signals from the amplifier 5 to pass to the integrator 23 and to the sine and cosine potentiometers 22 and 21 the outputs from the three integrators 23, 24, and 25 will represent the values of the integrals $\int r d\theta$, $\int r\cos\theta d\theta$, and $\int r\sin\theta d\theta$ respectively at the instantaneous value of $\theta$ until the microswitch 16 operates the bistable circuit 14 to close the switch 13 whereupon the outputs of the three integrators 23, 24 and 25 will be held by their respective capacitors at the value of the above mentioned integrals between the angles $\theta_1$ and $\theta_2$. These integrals multiplied by the factors determined by the potentiometers 30, 31 and 32 are fed to the inputs of two summing circuits 35 and 36 to provide output signals representing $\bar{x}$ and $\bar{y}$ respectively. The voltage output signal representing $\bar{R}$ is produced by the summing circuit 37 the inputs to which are signals from the potentiometers 33 and 34 representative of $\bar{x}$ and $\bar{y}$ to a factor, and also the signal from the potentiometer 32c which represents the integral $$\int_{\theta_1}^{\theta_2} r d\theta.$$

The output signals $\bar{x}$, $\bar{y}$ and $\bar{R}$ which are produced instant by instant during the traverse of the stylus 3 across the surface 2 are also fed to a further computing circuit 101 which combines the values of $\bar{x}$ and $\bar{y}$ with signals representing the sine and cosine of the instantaneous value of the angle $\theta$ to provide a signal representing the limacon which is used to generate a graphical display of the reference line in a display 102; alternatively the signal representing the limacon could be combined with the profile data $r$ by means of a subtractor to produce a true out-of-roundness indication as a central graphical record or as a readout. The output signals $x$ and $y$ can also be fed to respective demagnifiers 103, 104 the output signals from which accurately represent the $\bar{x}$ and $\bar{y}$ coordinates of the centre of the workpiece with respect to the centre of relative rotation.

It is preferable that the values of the limit angles $\theta_2$ and $\theta_1$ are so arranged that at the intermediate position exactly between the two angles the sine potentiometer produces a zero factor and the cosine potentiometer produces a unity factor since this simplifies the equations thereby allowing the relatively simple circuit to be used. The simplified equations where the angle from $\theta_1$ to the midpoint and from the midpoint to $\theta_2$ are both equal, and indicated as $-\theta_0$ and $\theta_0$ respectively, are as follows:

$$\bar{x} = \left[\int_{-\theta_0}^{\theta_0} r\cos\theta d\theta - \frac{\sin\theta_0}{\theta_0}\int_{-\theta_0}^{\theta_0} r d\theta\right] \frac{1}{\theta_0 + \frac{\sin 2\theta_0}{2} - \frac{1}{\theta_0} + \frac{\cos 2\theta}{\theta_0}}$$

$$\bar{y} = \left[\int_{-\theta_0}^{\theta_0} r\sin\theta d\theta\right] \frac{1}{\theta_0 - \frac{\sin 2\theta}{2}}$$

$$\bar{R}_0 = \frac{1}{2\theta}\left[\int_{-\theta_0}^{\theta_0} r d\theta - 2\sin\theta_0 x\right]$$

Figure 5:
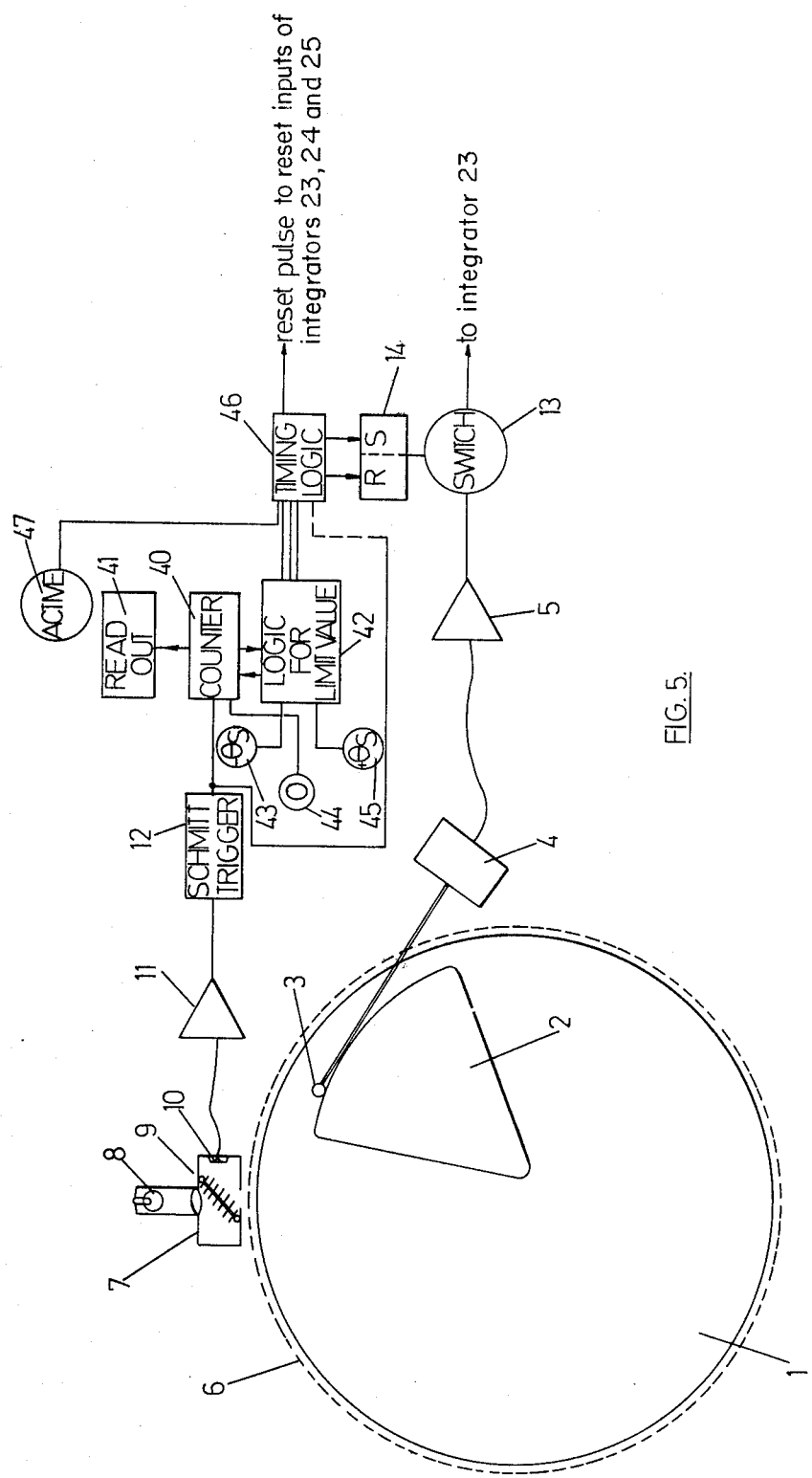
FIG. 5 is a schematic diagram of a second embodiment of the invention.

Referring now to the alternative embodiment shown in FIG. 5, in which the table 1 is turns counterclockwise during a measuring traverse, and in which the circuit from the switch 13 which acts on the input data from the amplifier 5 is the same as in the embodiment of FIG. 4 but the arrangement for producing the start and stop signals, and the reset pulse are different. This embodiment has advantages over the embodiment of FIG. 4 in that it allows the positions of the angles $\theta_1$ and $\theta_2$ to be determined more accurately. The mircoswitches 15 and 16 of the embodiment of FIG. 4 have an inherent uncertainty in their operation equivalent to a peripheral distance in the region of 20 thousandths of an inch. At a 6 inch diameter this corresponds to a computational accuracy of about 1 percent over an integrating range of 30° since there will also be a discrepancy between the factors set in the potentiometers and the actual angle of integration. The embodiment of FIG. 5 is arranged to overcome this slight inaccuracy in the operation of the embodiment of FIG. 4 by providing a track 6 on the turntable 1 and a combined source and pickup 7 forming a photoelectric detector system. The track comprises alternate and uniformly spaced segments which respectively absorb and reflect light from a source 8. The reflected light is received by a photocell 10 via a beam splitter 9. As an alternative the reflection optical encoder may be replaced by a transmission optical encoder or alternatively by a magnetic track operated in conjunction with magnetic reading heads. The width of the reflecting and absorbing segments of the track may be in the region of 12 thousandths of an inch from which an accuracy in the region of 4 thousandths of an inch may be obtained in practice.

The transit of segments past the optical encoder is converted into the edges of electric pulses by means of an amplifier 11 and Schmidt trigger 12. The change of angle by the rotation of the turntable is recorded by counting the pulses in a counter 40 and readout 41. The output from the counter 40 is also passed to a logic circuit 42 which decodes from the counter trigger pulses for angles representing $\theta_1$ and $\theta_2$ which may be determined in a preliminary setting up traverse of the stylus 3 over the workpiece surface 2. These may be set up as $+\theta_0$ and $-\theta_0$ with respect to a central position as described above, by means of inputs 43 and 45, and this allows the potentiometers 30a, 31b, and 32a to be dispensed with, as well as the potentiometer 34 and the inverter 39. The logic circuit 42 provides output signals, which correspond to those signals generated by microswitches 15, 16 and 17 of FIG. 4, when the counter 40 has counted pulses from the Schmidt trigger 12 corresponding to the angles set into the circuit by the inputs 43 and 45. These signals are fed to a timing logic circuit 46 which provides outputs of the correct duration to set and reset the bistable 14 and control switch 13 in the same way as described in connection with FIG. 4.

Alternatively, however, the output from the Schmidt trigger 12 may also be fed to the timing logic circuit 46 (this connection is shown by a broken line in FIG. 5); in this case the pulses from the Schmidt trigger can be used to operate the integrators of the circuit shown in FIG. 4 via the switch 13 for a fixed time for each pulse from the Schmidt trigger of the trigger. Each pulse represents accurately an increment of angular rotation and a set pulse from timing logic circuit 46 opens gate 13 for an accurately controlled length of time following which gate 13 is closed by a reset pulse applied by timing logic 46 to the reset input of bistable 14. Switch 13 remains closed until the occurrence of a further Schmidt trigger pulse from timing logic 46. The total integration time is a measure of the total angular rotation as controlled by the limit values set on the circuit 42 by the inputs 43 and 45 thereof.

Moreover, because it is controlled by timing logic 46 in response to pulses from Schmidt trigger 12 the integration is the same irrespective of how the rotation proceeds between pulses so that the turntable may in such an embodiment be rotated at varying speeds during the traverse providing that the time per angular increment is not so short as to encroach upon the value of the time of operation of the integrators.

This technique may be used with advantage when a stepping motor is used to drive the turntable, the stepping motor being stationary while each integration pulse is transmitted. This allows an oscillator from which the stepping motor drive is taken to act as a clock source and a further improvement in resolution of the angular steps may thus be provided, subject to errors in the gears of the drive (2 minutes) and motor step position error (less than 1 minute at the turntable). The use of a stepping motor drive provides the best results when acquiring data during rest periods of the drive although its use involves slower rotational speed and the necessity for utilising some form of hydrostatic bearing or multiple gearing for the turntable spindle.

Figure 6:
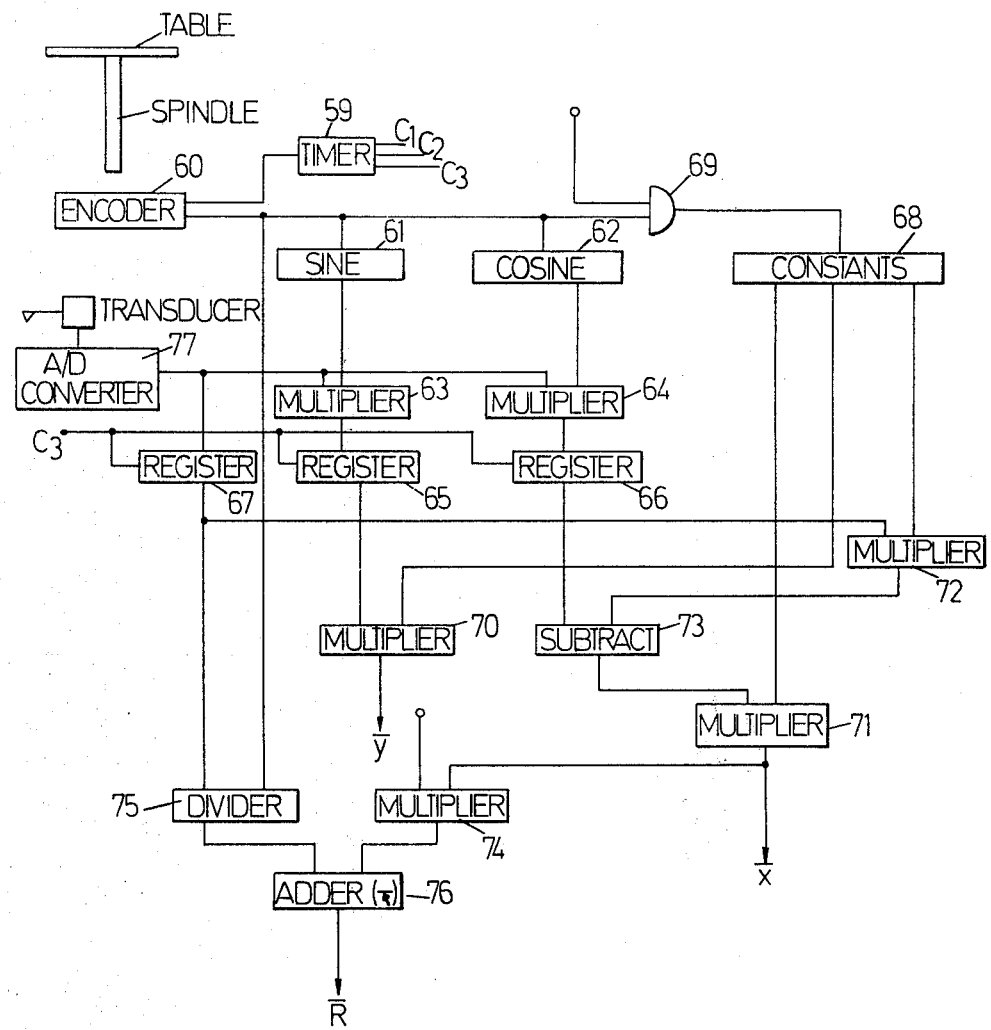
FIG. 6 is a schematic diagram of a third embodiment of the invention.

Referring now to FIG. 6 there is shown a block schematic diagram of an alternative embodiment in which the circuit of FIG. 4, which acts as an analogue computer, is replaced by a circuit acting as a special purpose digital computer. For this embodiment the data signal is converted into a flow of digital words at a rate determined by a clock source. The cosine and sine potentiometers are replaced by cosine and sine look-up tables 61 and 62 of an ROM which accepts signals representing values of angle $\theta$ in digital form for example from a device such as the counter 40 of FIG. 5. The outputs from the tables 61 and 62 are fed to respective multipliers 63 and 64 which accept the sine and cosine values respectively together with the data digital words as factors over the angle of valid data acquisition. The inputs to the look-up tables 61 and 62 representing the value of the angle $\theta$ at any instant is provided by an encoder 60, which may be of the type described with reference to FIG. 5 which is fed with clock pulses from a timer 59 which also produces output timing signals $C_1$, $C_2$ and $C_3$ which control the arrangement as will be described below. The timing signal $C_2$ is fed to the multipliers 63 and 64 to control their output signals which are fed to accumulator registers 65 and 66 respectively.

The analogue output signal from the transducer is fed to an analogue-digital converter 75 controlled by the timing signal $C_1$ the outputs of which are fed as the above mentioned digital words as factors to the multipliers 63 and 64, and also as input signals to a further accumulator register 67. The process of accumulation in the three registers 65, 66 and 67 constitutes integration and this continues until a stop signal along the line $C_3$ is generated by the timer 59. The data accumulated in the three registers 65, 66 and 67 then represents the three integrals $\int r\sin\theta d\theta$, $\int r\cos\theta d\theta$ and $\int rd\theta$ respectively. The parameters $\bar{x}$, $\bar{y}$ and $\bar{R}$ are computed in digital form subsequent to the transmission of a stop signal by multiplying or dividing the contents of the three registers by factors derived from the angle over which data is provided, and by combining the factored outputs. These factors are provided by a constants look-up arrangement 68 which is fed with a digital signal representing the angle $\theta$ from the encoder 60 via a gate 69. The factors required may be set manually into the computer from an angular readout obtained on setting up the arrangement or the computer itself can be arranged to set up the factors by a sub-routine in which only the angular data at the start and stop signals are required. The outputs from the constants look-up device 68 are fed to respective multipliers 70, 71 and 72 which are connected to a substrate circuit 73, a further multiplying circuit 74, a dividing circuit 75 and an adder 76 as shown in the drawing.

In operation of this circuit it is necessary to utilise at least one initial traverse to determine the position of the end points $\theta_1$ and $\theta_2$ so that the device can be arranged to operate symmetrically about a midpoint as described above in relation to FIG. 4. The data acquiring traverse is then performed to provide the effective integration at the registers 65, 66 and 67 following which the clock pulses from the timer 59 feeding the tables 61, 62 and 68 are stopped and six timing pulses $T_0$ to $T_5$ are produced to control the operation of the multiplier and adder circuits 70 to 76. The six time intervals are used, in order to ensure that the circuit outputs are stable before they influence the result. Values of $\bar{x}$, $\bar{y}$ and $\bar{R}$ are formed at the outputs of the multiplier 71, the multiplier 70 and the adder 76 respectively. The values of $\bar{x}$, $\bar{y}$ and $\bar{R}$ may then be used to drive suitably geared stepping motors to effect centering of the component with respect to the table centre.

It will be appreciated from the above that the present invention provides an instrument in which the profile of a component may be sensed over a limited arc less than a full rotation and the data used to provide output signals representing both the eccentricity components of the workpiece with respect to the reference centre of the work table, and also to produce a reference line against which departures of the surface over the arc sensed may be compared.

We claim:

1. A method of testing a body having at least a part-circular surface, comprising the steps of:

traversing a sensor over a limited arc, less than a full circle, of said surface by effecting relative rotation between said body and said sensor about a centre of relative rotation;

providing from said sensor amplified signals representative of the profile of the surface thereof, providing signals representative of the relative angular orientation of said body and said sensor, and conbining said sensor signals with said angular orientation signals to provide an output signal representative of a reference curve centred at the centre of said at least partcircular surface of said body.

2. The method of claim 1, wherein said reference curve produced from said sensor signals and said angular orientation signals has the form $$\rho(\theta) = \bar{R} + \bar{x}\cos\theta + \bar{y}\sin\theta$$

where $\bar{R}$ is the nominal radius of the reference line, $\bar{x}$ is the $x$ coordinate of the centre of the workpiece with respect to the centre of the relative rotation of the workpiece and sensor, $\bar{y}$ represents the $y$ coordinate of the centre of the workpiece with respect to the centre of relative rotation of the workpiece and sensor, and $\theta$ is a variable representing the relative angular orientation of the said body and said sensor at any instant during said traverse....

3. A method of determining the eccentricity of the centre of a body having an at least part-circular profile, comprising the steps of:

traversing a sensor over a limited arc, less than a full circle, over the surface of said body by effecting relative rotation between said body and said sensor, providing an amplified output signal from said sensor representing said profile of said surface between the end points of said traverse, providing signals representative of the relative angular orientation of said body and said sensor, and combining said sensor signal and said relative orientation signals to provide output signals representing the value of the parameters $\bar{x}$ and $\bar{y}$ as solutions of the set of equations obtained by minimising the integral in the equation:

$$I = \int_{\theta_1}^{\theta_2} [r(\theta) - (\bar{R} + \bar{x}\cos\theta + \bar{y}\sin\theta)]^2 d\theta$$

where $\theta_1$, and $\theta_2$ represent the relative angular orientations of said body and said sensor at the end points of said traverse, $r(\theta)$ represents said sensor signal at the relative orientation of said body and said sensor indicated by the variable $\theta$ and $\bar{R}$ is the nominal radius of the reference line, $\bar{x}$ is the $x$ coordinate of the centre of the workpiece with respect to the centre of the relative rotation of the workpiece and sensor.

$\bar{y}$ represents the $y$ coordinate of the centre of the workpiece with respect to the centre of relative rotation of the workpiece and sensor.

4. The method of claim 3, wherein said signals representing said parameters $\bar{x}$ and $\bar{y}$ are demagnified and displayed to provide an output indication of the $x$ and $y$ coordinates of the centre of that part of said part circular surface traversed by said sensor with respect to the centre of relative rotation as origin.

5. Apparatus for testing the surface of a body having an at least part circular surface thereon comprising:

mounting means for said body, a sensor mounted with respect to said body mounting means wereby said sensor can be traversed over said body upon relative rotation between said sensor and said body mounting means, amplifier means connected to said sensor for providing amplified sensor signals upon traversing of said sensor over said surface of said body, means sensitive to the relative angular inclination between said sensor and said body mounting means for providing an output signal representative thereof, means connecting the output of said angular inclination sensitive means to a computing circuit and, means connecting the output of said amplifier to said computing circuit, said computing circuit operating, upon reception of said amplified sensor signals and said angular orientation signals to provide output signals representing the solutions $\bar{x}$ and $\bar{y}$ of the equation:

$$I = \int_{\theta_1}^{\theta_2} [r(\theta) - (\bar{R} + \bar{x}\cos\theta + \bar{y}\sin\theta)]^2 d\theta$$

as said sensor is traversed over said body between two relative angular orientations represented by $\theta_1$ and $\theta_2$, where $r(\theta)$ represents said sensor signal at the relative orientation of said body and said sensor indicated by the variable $\theta$, $\bar{R}$ is the nominal radius of the reference line, $\bar{x}$ is the $x$ coordinate of the centre of the workpiece with respect to the centre of the relative rotation of the workpiece and sensor, $\bar{y}$ represents the $y$ coordinate of the centre of the workpiece with respect to the centre of relative rotation of the workpiece and sensor.

6. The apparatus of claim 5, wherein said computing circuit further includes means for deriving a signal representing the parameter R and for producing an output signal of the form:

$$\rho(\theta) = \bar{R} + \bar{x}\cos\theta + \bar{y}\sin\theta$$

to represent a reference line against which variations in said amplified sensor signai can be compared.

7. The apparatus of claim 5, wherein there are further provided means for demagnifying said signals representing said parameters $x$ and $y$ and display means for displaying the demagnified signals which thus represent the coordinates of the centre of said part-circular surface of the body, over the limited arc traversed by said sensor, with respect to said centre of relative rotation as origin.

8. The apparatus of claim 5, wherein said means for generating signals representing the relative angular orientation between said body mounting means and said sensor comprise sine and cosine potentiometers, means mechanically interconnecting said sine and cosine potentiometers with said sensor and said bodymounting means, and means connecting said sensor output and said sine and cosine potentiometers, whereby said sensor output signal is fed to said sine and cosine potentiometers.

9. The apparatus of claim 8, wherein the outputs from said sine and cosine potentiometers are connected to respective integrating circuits,
means connecting the outputs of said integrating circuits to respective inverting circuits,
a plurality of linear potentiometers connected between the outputs of said inverting circuits and the outputs of said integrating circuits,
a further integrating circuit connected to the output of said amplifier,
A further inverting circuit connected to the output of said further integrating circuit, and
further linear potentiometers connected between the output of said further integrating circuit and the output of said further inverting circuit, said linear potentiometers and said further linear potentiometers operating to multiply the signals fed thereto from said integrators and said inverters by factors representing ratios of the contants A, B, C, D, E, F as follows:

$$A = \int_{\Theta_1}^{\Theta_2} \sin^2\Theta d\Theta - \frac{1}{\Theta_2 - \Theta_1}\left[\int_{\Theta_1}^{\Theta_2} \sin\Theta d\Theta\right]^2$$

$$B = \frac{1}{\Theta_2 - \Theta_1}(\sin\Theta_2 - \sin\Theta_1)$$

$$C = \frac{1}{\Theta_2 - \Theta_1}\int_{\Theta_1}^{\Theta_2} \cos\Theta d\Theta \int_{\Theta_1}^{\Theta_2} \sin\Theta d\Theta - \int_{\Theta_1}^{\Theta_2} \sin\Theta\cos\Theta d\Theta$$

$$D = \frac{1}{\Theta_2 - \Theta_1}(\cos\Theta_1 - \cos\Theta_2)$$

$E = AF - C^2$ where $A$ $F$ and $C$ are as here defined $$F = \int_{\Theta_1}^{\Theta_2} \cos^2\Theta d\Theta - \frac{1}{\Theta_2 - \Theta_1}\left[\int_{\Theta_1}^{\Theta_2} \cos\Theta d\Theta\right]^2$$

10. The apparatus of claim 9, wherein there are further provided first and second summing circuits connected to the outputs of selected said potentiometers, the output of said first summing circuit representing the parameter $\bar{x}$ and the output from said second summing circuit representing the parameter $\bar{y}$,
first and second invertors connected to the outputs of said first and second summing circuits,
first and second linear potentiometers connected respectively between the outputs of said first summing circuit and said first invertor, and between said second summing circuit, and said second invertor, the outputs from said first and second potentiometers being connected to the input of a third summing circuit, and
the output from a selected one of said further potentiometers being connected to the input of said third summing circuit, whereby the output from said third summing circuit represents the parameter $\bar{R}$ as herein defined.

11. The apparatus of claim 10, wherein there is provided a further computing circuit connected to the outputs of said first and second potentiometers and to the output of said third summing circuit, the output signal from said further computing circuit being in the form $$\rho(\theta) = \bar{R} + \bar{x}\cos\theta + \bar{y}\sin\theta$$

and means for displaying said signal, said display means also being connected to the output of said amplifier whereby to receive signals representing said amplified sensor signals for display.

12. The apparatus of claim 5, wherein said means for producing signals representative of the relative angular orientation between said body and said sensor include means for determining the end points of the traverse of said sensor over said limited arc and means for controlling said computing circuit to operate only on sensor signals generated when said relative angular orientation of said body and said sensor lies between said end points.

13. The apparatus of claim 12, wherein said means for determining said end points includes first and second mechanically operated switches, and said means for controlling said computing circuit includes a bistable circuit and an electrically operated switch having a control input connected to the output of said bistable circuit,
means connecting said first mechanically operated switch to the set input of said bistable circuit,
means connecting said second mechanically operated switch to the reset input of said bistable circuit,
mounting means for said first and second mechanically operated switches,
switch operating means for said first and second mechanically operated switches, said switch operating means being mounted so that relative angular movement between said body and said sensor causes relative angular movement between said switches and said switch operating means whereby said set input of said bistable circuit is energised to open said electrically operated switch to pass sensor signals to said computing circuit only when said sensor lies between the end points of said traverse as determined by the positions of said first and second switches.

14. The apparatus of claim 13, wherein the relative angular positions of said mechanically operated switches are adjustable.

15. The apparatus of claim 13, wherein there is a third mechanically operated switch operable by said switch operating member and mounted on the side of said first mechanically operated switch remote from said second mechanically operated switch,
a reset pulse generator connected to said third mechanically operated switch, and
means connecting the output of said reset pulse generator to said reset input of said bistable circuit whereby, in operation, said third mechanically operated switch is operated by said switch operating means to energise said reset pulse generator to feed reset pulses to said bistable circuit to ensure this is in its reset state upon subsequent operation, during the same traverse of said first mechanically operated swtich to energise said set input of said bistable circuit.

16. The apparatus of claim 15, wherein said pulse generator is also connected to reset inputs of said integrating circuits whereby to ensure these are cleared before the commencement of an operative part of a traverse upon operation of said first switch.

17. The apparatus of claim 12, wherein said means for determining said end parts of a traverse includes an optical encoder.

18. The apparatus of claim 17, wherein said optical encoder comprises a member mounted on said body mounting means having a plurality of alternate reflective and absorbent segments,
    a light source,
    means mounting said light source with said sensor whereby relative movement between said body mounting means and said sensor causes corresponding relative movement between said light source and said segmented member,
    a photo detector mounted with said light source for detecting light reflected from said reflective segments as said detector is traversed therepast and for producing output pulses in dependent thereon,
    counting means connected to the output of said detector for receiving and counting said detector output pulses to provide an output signal representative of the relative angular orientation of said body and said sensor.

19. The apparatus of claim 18, wherein a logic circuit is connected to the output of said counter, the output from said logic circuit being connected to the control input of an electrically operated switch connected in the output line from said sensor, said logic circuit operating to open said electrically operated switch only between two selected relative angular orientations of said body and said sensor.

20. The apparatus of claim 19, wherein said logic circuit is also connected to the reset inputs of said integrating circuits said logic circuit operating to apply reset pulses to said integrating circuits upon relative rotation of said body and said sensor toward one of said selected two relative angular positions when said body and said sensor are outside the range determined by said two selected relative angular orientations.

21. The apparatus of claim 5, wherein there are provided analogue-to-digital convertor means for connecting the output signals from said sensor into digital form,
    an optical encoder providing digital signals representative of the relative angular orientation of said body and said sensor, and
    special purpose digital computor means connected to the output of said optical encoder and said analogue-to-digital convertor means, said digital computer means operating to produce from the digital signals fed thereto ouput signals representing the parameters $\bar{x}$, $\bar{y}$ and $\bar{R}$.

22. The apparatus of claim 21, including sine and cosine lookup devices each fed with the output signal from said optical encoder,
    first and second multiplier circuits,
    means connecting the output from said sine potentiometer to said first multiplier,
    means connecting the output from said cosine potentiometer to said second multiplier, and
    means connecting the output from said analogue-to-digital connentor to both said first and said second multipliers.

23. The apparatus of claim 22, further comprising first and second accumulator registers,
    means connecting the output of said first multiplier to said first register,
    means connecting the output of said second multiplier to said second register,
    a third accumulator register,
    means connecting the output of said analogue-to-digital connector to said third accumulator register,
    timing control means, and
    means connecting the output of said timing control means to said first, second and third accumulator registers.

24. The apparatus of claim 23 further comprising:
    a third multiplier circuit,
    memory storage means storing values of the constants A, B, C, D, E, and F, where $$A = \int_{\Theta_1}^{\Theta_2} \sin^2\Theta\, d\Theta - \frac{1}{\Theta_2 - \Theta_1}\left[\int_{\Theta_1}^{\Theta_2} \sin\Theta\, d\Theta\right]^2$$

$$B = \frac{1}{\Theta_2 - \Theta_1}(\sin\Theta_2 - \sin\Theta_1)$$

$$C = \frac{1}{\Theta_2 - \Theta_1}\int_{\Theta_1}^{\Theta_2} \cos\Theta\, d\Theta \int_{\Theta_1}^{\Theta_2} \sin\Theta\, d\Theta - \int_{\Theta_1}^{\Theta_2} \sin\Theta\cos\Theta\, d\Theta$$

$$D = \frac{1}{\Theta_2 - \Theta_1}(\cos\Theta_1 - \cos\Theta_2)$$

$E = AF - C^2$ where $A$ $F$ and $C$ are as here defined $$F = \int_{\Theta_1}^{\Theta_2} \cos^2\Theta\, d\Theta - \frac{1}{\Theta_2 - \Theta_1}\left[\int_{\Theta_1}^{\Theta_2} \cos\Theta\, d\Theta\right]^2$$

means connecting the output from said first accumulator register to said third multiplier, and
means connecting the output of said memory storage means to said third multiplier.

25. The apparatus of claim 24 further comprising:
    a subtractor circuit,
    means connecting the output from said second accumulator register to said subtractor circuit,
    a forther multiplier circuit,
    means connecting the output from said memory storage circuit to said fourth multiplier means,
    means connecting the output of said third accumulator register to said fourth multiplier circuit,
    means connecting the output from said fourth multiplier circuit to said divider circuit,
    a fifth multiplier circuit, means connecting the output from said memory storage means to said fifth multiplier circuit, and
    means connecting the output from said subtractor circuit to said fifth multiplier circuit, 26. The apparatus of claim 25 further comprising a sixth multiplier circuit, means connecting the output from said fifth multiplier circuit to said sixth multiplier circuit, mean means connecting the output of said timing control circuit to said sixth multiplier circuit,
    a divider circuit, means connecting the output of said third accumulator register to said divider circuit,
means connecting the output from said optical encoder to said divider circuit,
an adder circuit, means connecting the output from said divider circuit to said adder circuit, and
means connecting the output of said sixth multiplier circuit to said adder circuit.

* * * * *